United States Patent
Li et al.

(10) Patent No.: US 10,270,539 B2
(45) Date of Patent: Apr. 23, 2019

(54) MODEM, COMMUNICATIONS METHOD OF MODEM, AND WIRELESS CHARGING METHOD AND DEVICE

(71) Applicant: Huawei Technologies Co., Ltd., Shenzhen (CN)

(72) Inventors: Shanfu Li, Shenzhen (CN); Kai Zhang, Xi'an (CN); Daiqi Zhou, Shenzhen (CN); Dawei Huo, Shenzhen (CN); Kangmin Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 15/167,567

(22) Filed: May 27, 2016

(65) Prior Publication Data

US 2016/0277124 A1   Sep. 22, 2016

Related U.S. Application Data

(63) Continuation of application No. PCT/CN2014/075104, filed on Apr. 10, 2014.

(30) Foreign Application Priority Data

Nov. 29, 2013  (CN) .......................... 2013 1 0631100

(51) Int. Cl.
*H04B 10/80*  (2013.01)
*H04M 11/06*  (2006.01)
(Continued)

(52) U.S. Cl.
CPC ............ *H04B 10/808* (2013.01); *H02J 7/025* (2013.01); *H02J 50/10* (2016.02); *H04M 11/066* (2013.01);
(Continued)

(58) Field of Classification Search
CPC .................................................... H04B 10/025
USPC ........................................................ 375/222
See application file for complete search history.

(56) References Cited

U.S. PATENT DOCUMENTS 4,578,533 A   3/1986  Pierce
7,031,465 B1  4/2006  Dibble et al.
(Continued)

FOREIGN PATENT DOCUMENTS

CN   201594762 U   9/2010
CN   201781490 U   3/2011
(Continued)

*Primary Examiner* — Lihong Yu
(74) *Attorney, Agent, or Firm* — Leydig, Voit & Mayer, Ltd.

(57) ABSTRACT

The present invention provides a communications method of a modem, including: determining a current power supply mode; if it is determined that the current power supply mode is that a network device is used to supply power by using a copper twisted pair, switching a communications interface from a fiber interface to an electrical interface, where the electrical interface connects to the network device by using the copper twisted pair and the fiber interface connects to a passive optical network by using an optical fiber. The present invention further provides a modem, and a wireless charging method and device. According to the technical solutions provided in the present invention, it is implemented that a service can still be provided after an external power supply is powered off.

16 Claims, 10 Drawing Sheets

(51) Int. Cl.
*H02J 7/02* (2016.01)
*H02J 50/10* (2016.01)
*H04M 19/08* (2006.01)
*H04Q 11/00* (2006.01)
*H04W 4/80* (2018.01)
*H04L 12/10* (2006.01)
*H04W 84/12* (2009.01)

(52) U.S. Cl.
CPC ........ *H04M 19/08* (2013.01); *H04Q 11/0003* (2013.01); *H04Q 11/0067* (2013.01); *H04Q 11/0071* (2013.01); *H04W 4/80* (2018.02); *H04L 12/10* (2013.01); *H04Q 2011/0039* (2013.01); *H04W 84/12* (2013.01)

(56) References Cited

U.S. PATENT DOCUMENTS

| | | | | |
|---|---|---|---|---|
| 2002/0097728 | A1* | 7/2002 | Hinderks | G06Q 30/02 370/395.52 |
| 2006/0083343 | A1* | 4/2006 | Roederer | H04L 7/033 375/375 |
| 2008/0080595 | A1* | 4/2008 | Wang | H04B 3/36 375/211 |
| 2009/0284082 | A1 | 11/2009 | Mohammadian | |
| 2010/0232798 | A1* | 9/2010 | Kozaki | H04B 10/272 398/98 |
| 2010/0248622 | A1 | 9/2010 | Lyell et al. | |
| 2012/0243871 | A1 | 9/2012 | Huang et al. | |
| 2012/0290470 | A1 | 11/2012 | Lee et al. | |

FOREIGN PATENT DOCUMENTS

| | | |
|---|---|---|
| CN | 102027686 A | 4/2011 |
| CN | 102414955 A | 4/2012 |
| CN | 202832485 U | 3/2013 |
| CN | 103618843 A | 3/2014 |
| EP | 1339053 A1 | 8/2003 |
| EP | 2642688 A1 | 9/2013 |
| FR | 2682843 A1 | 4/1993 |
| WO | WO 2008050917 A1 | 5/2008 |

\* cited by examiner

MODEM, COMMUNICATIONS METHOD OF MODEM, AND WIRELESS CHARGING METHOD AND DEVICE

CROSS-REFERENCE TO RELATED APPLICATION

This application is a continuation of International Patent Application No. PCT/CN2014/075104, filed on Apr. 10, 2014, which claims priority to Chinese Patent Application No. 201310631100.X, filed on Nov. 29, 2013, both of which are hereby incorporated by reference in their entireties.

TECHNICAL FIELD

The present invention relates to network communications technologies, and in particular, to a modem, a communications method of the modem, and a wireless charging method and device.

BACKGROUND

A dedicated digital subscriber line (Digital Subscriber Line, DSL) technology is a user access technology based on an ordinary telephone line. A data signal and a voice signal are separately transmitted through a same copper twisted pair, and the data signal does not pass through a telephone exchange, which reduces load of the telephone exchange; and a user may keep online with no need to dial, which belongs to a dedicated network access manner. FIG. 1 is an exemplary diagram of a copper twisted pair access manner in the prior art. As shown in FIG. 1, a modem on a user side connects to an access device on a network side by using a copper twisted pair, and performs modulation processing and demodulation processing on a data signal, so as to implement uplink transmission and downlink transmission of the data signal. Meanwhile, the modem communicates with a user equipment through a Gigabit Ethernet (Gigabit Ethernet, GE) interface or Wi-Fi, where the user equipment may be a personal computer.

There is another user access technology, that is, fiber access (Fiber-to-the-x, FTTx) technology. The FTTx technology includes fiber to the home (FTTH), fiber to the premise (FTTP), FTTC fiber to the curb or the neighborhood, FTTN fiber to the node, FTTO fiber to the office, and FTTSA fiber to the service area (FTTx, x=H for home, P for premises, C for curb and N for node or neighborhood, O for office, SA for service area). The FTTx technology mainly uses a passive optical network (Passive Optical Network, PON) access technology to provide access for a user. FIG. 2 is an exemplary diagram of a PON access manner in the prior art. As shown in FIG. 2, a modem of an optical signal on a user side connects to an access device on a network side by using an optical fiber of a PON, performs modulation processing and demodulation processing on a data signal, and provides the data signal for a user. Meanwhile, the modem of the optical signal communicates with a user equipment through an RJ 45 interface or Wi-Fi.

For the foregoing two user access manners, bandwidth in a copper twisted pair access manner is less than bandwidth in an optical fiber access manner. The copper twisted pair access manner is gradually replaced with the optical fiber access manner, which results in discarding of many copper twisted pairs. In addition, in the optical fiber access manner, a PON is a passive network; therefore, power of a modem of an optical signal needs to be supplied by an external power supply.

However, after the external power supply of the modem is powered off, the modem cannot provide a service for a user because of the power-off, causing that a user side of the modem cannot use a data service and a voice service.

Currently, a copper twisted pair supplies power to a user telephone in a wired manner, where the telephone needs to be connected to a line telephone port by using the copper twisted pair, so as to obtain power. However, a limitation on a location of a telephone line port in a home exists, and a telephone can obtain power only if the telephone supports a connection with the telephone line port; therefore, the telephone cannot conveniently obtain the power.

SUMMARY

In view of this, embodiments of the present invention provide a modem, a communications method of the modem, and a wireless charging method and device, so that a modem can still provide a service after an external power supply is powered off.

According to a first aspect, an embodiment of the present invention provides a communications method of a modem, including:

determining a current power supply mode; and if it is determined that the current power supply mode is that a network device is used to supply power by using a copper twisted pair, switching a communications interface from a fiber interface to an electrical interface, where the electrical interface connects to the network device by using the copper twisted pair and the fiber interface connects to a passive optical network by using an optical fiber.

In a first possible implementation manner of the first aspect, the method further includes: transmitting a data signal and/or a voice signal by using the electrical interface.

With reference to the first aspect or the first possible implementation manner of the first aspect, in a second possible implementation manner of the first aspect, the method further includes:

communicating with a wireless communications network by using an access device of the wireless communications network, so as to transmit the data signal or transmit the voice signal and the data signal.

With reference to the second possible implementation manner of the first aspect, in a third possible implementation manner of the first aspect, the wireless communications network is a 2G network, a 3G network, or a 4G network.

With reference to the first possible implementation manner of the first aspect, in a fourth possible implementation manner of the first aspect, the data signal includes a data signal of a digital subscriber line xDSL and/or a data signal of the passive optical network.

With reference to the first possible implementation manner of the first aspect or the fourth possible implementation manner of the first aspect, in a fifth possible implementation manner of the first aspect, the transmitting a data signal by using the electrical interface includes:

performing encapsulation processing on a digital signal by using an asynchronous transfer mode protocol ATM and an ATM adaptation layer protocol; and performing DSL front end line driving, so as to transmit, to the network device by using the copper twisted pair, a data signal that is obtained after encapsulation processing.

With reference to the first possible implementation manner of the first aspect, in a sixth possible implementation manner of the first aspect, the transmitting a voice signal by using the electrical interface includes: modulating the voice signal to the copper twisted pair.

According to a second aspect, an embodiment of the present invention provides a communications method of a modem, including:

determining a current power supply mode; and if it is determined that the current power supply mode is that a network device is used to supply power by using a copper twisted pair, switching a communications interface of a data signal from an electrical interface to a wireless communications module, where the electrical interface connects to the network device by using the copper twisted pair and the wireless communications module connects to a wireless communications network by using an access device of the wireless communications network.

In a first possible implementation manner of the second aspect, the method further includes:

communicating with the wireless communications network by using the access device of the wireless communications network, so as to transmit a data signal or transmit a voice signal and a data signal.

With reference to the first possible implementation manner of the second aspect, in a second possible implementation manner of the second aspect, the wireless communications network is a 2G network, a 3G network, or a 4G network.

With reference to the second aspect or the first possible implementation manner of the second aspect, in a third possible implementation manner of the second aspect, the method further includes:

transmitting the voice signal by using the electrical interface.

With reference to the second aspect or the first possible implementation manner of the second aspect, in a fourth possible implementation manner of the second aspect, the data signal includes a data signal of a digital subscriber line xDSL and/or a data signal of a passive optical network.

According to a third aspect, an embodiment of the present invention provides a wireless charging method, including:

obtaining, by a wireless charging device, electrical energy that is supplied by a network device by using a copper twisted pair; and performing, by the wireless charging device, wireless charging on an external device by using the electrical energy.

In a first possible implementation manner of the third aspect, the method further includes:

detecting a load parameter of the wireless charging device; and performing output control on the wireless charging according to the detected load parameter.

With reference to the first possible implementation manner of the third aspect, in a second possible implementation manner of the third aspect, the performing output control on the wireless charging according to the detected load parameter includes:

if the load parameter is greater than an upper limit value of a preset load range, decreasing an output power at which the wireless charging is performed on the external device; or if the load parameter is less than a lower limit value of a preset load range, increasing an output power at which the wireless charging is performed on the external device.

With reference to the third aspect and the first possible implementation manner of the third aspect, in a third possible implementation manner of the third aspect, the method further includes: communicating, by the wireless charging device, with a wireless communications network by using an access device of the wireless communications network, so as to transmit a data signal.

With reference to the third possible implementation manner of the third aspect, in a fourth possible implementation manner of the third aspect, the wireless communications network is a 2G network, a 3G network, or a 4G network.

With reference to the third aspect and the fourth possible implementation manner of the third aspect, in a fifth possible implementation manner of the third aspect, the method further includes: communicating, by the wireless charging device, with the wireless communications network by using a wireless interface, so as to transmit the data signal.

With reference to the fifth possible implementation manner of the third aspect, in a sixth possible implementation manner of the third aspect, the wireless interface is a Wi-Fi, Bluetooth, or infrared interface.

According to a fourth aspect, an embodiment of the present invention provides a modem, including:

a determining module, configured to determine a current power supply mode;

a fiber interface, configured to connect to a passive optical network by using an optical fiber;

an electrical interface, configured to connect to a network device by using a copper twisted pair; and a processing module, configured to: when the determining module determines that the current power supply mode is that the network device is used to supply power by using the copper twisted pair, switch a communications interface from the fiber interface to the electrical interface.

In a first possible implementation manner of the fourth aspect, the processing module is further configured to transmit a data signal and/or a voice signal by using the electrical interface.

With reference to the fourth aspect or the first possible implementation manner of the fourth aspect, in a second possible implementation manner of the fourth aspect, the modem further includes:

a wireless communications module, configured to communicate with a wireless communications network by using an access device of the wireless communications network, so as to transmit the data signal or transmit the voice signal and the data signal.

With reference to the second possible implementation manner of the fourth aspect, in a third possible implementation manner of the fourth aspect, the wireless communications network is a 2G network, a 3G network, or a 4G network.

With reference to the first possible implementation manner of the fourth aspect, in a fourth possible implementation manner of the fourth aspect, the data signal includes a data signal of a digital subscriber line xDSL and/or a data signal of the passive optical network.

With reference to the first possible implementation manner of the fourth aspect or the fourth possible implementation manner of the fourth aspect, in a fifth possible implementation manner of the fourth aspect, the electrical interface transmits the data signal, and the electrical interface further includes:

a decision feedback equalization DFE module, configured to perform encapsulation processing on a digital signal by using an asynchronous transfer mode protocol ATM and an ATM adaptation layer protocol; and a semiconductor laser diode LD module, configured to perform DSL front end line driving, so as to transmit, to the network device by using the copper twisted pair, a data signal that is obtained after encapsulation processing.

With reference to the fifth possible implementation manner of the fourth aspect, in a sixth possible implementation manner of the fourth aspect, the DFE module is integrated into the processing module.

With reference to the fifth possible implementation manner of the fourth aspect, in a seventh possible implementation manner of the fourth aspect, the electrical interface transmits the voice signal, and the electrical interface further includes:

an active front end AFE module, configured to modulate the voice signal to the copper twisted pair.

With reference to the fourth aspect, in an eighth possible implementation manner of the fourth aspect, the fiber interface includes an optical module, a serializer-deserializer Ser-Des interface, and a PON media access control MAC interface; and the Ser-Des interface and the PON MAC interface are integrated into the processing module.

According to a fifth aspect, an embodiment of the present invention provides a modem, including:

a determining module, configured to determine a current power supply mode;

an electrical interface, configured to connect to a network device by using a copper twisted pair;

a wireless communications module, configured to connect to a wireless communications network by using an access device of the wireless communications network; and a processing module, configured to: when the determining module determines that the current power supply mode is that the network device is used to supply power by using the copper twisted pair, switch a communications interface of a data signal from the electrical interface to the wireless communications module.

In a first possible implementation manner of the fifth aspect, the wireless communications module is further configured to communicate with the wireless communications network by using the access device of the wireless communications network, so as to transmit a data signal or transmit a voice signal and a data signal.

With reference to the first possible implementation manner of the fifth aspect, in a second possible implementation manner of the fifth aspect, the wireless communications network is a 2G network, a 3G network, or a 4G network.

With reference to the fifth aspect or the first possible implementation manner of the fifth aspect, in a third possible implementation manner of the fifth aspect, the processing module is further configured to transmit the voice signal by using the electrical interface.

With reference to the fifth aspect or the first possible implementation manner of the fifth aspect, in a fourth possible implementation manner of the fifth aspect, the data signal includes a data signal of a digital subscriber line xDSL and/or a data signal of a passive optical network.

According to a sixth aspect, an embodiment of the present invention provides a wireless charging device, including:

an electrical energy acquiring module, configured to obtain electrical energy that is supplied by a network device by using a copper twisted pair; and an electrical energy supplying module, configured to perform wireless charging on an external device by using the electrical energy that is obtained by the electrical energy acquiring module.

In a first possible implementation manner of the sixth aspect, the wireless charging device further includes:

a detecting module, configured to detect a load parameter of the electrical energy supplying module; and a control module, configured to perform, according to the load parameter detected by the detecting module, output control on the wireless charging performed by the electrical energy supplying module.

With reference to the first possible implementation manner of the sixth aspect, in a second possible implementation manner of the sixth aspect, the performing, according to the detected load parameter, output control on the wireless charging performed by the electrical energy supplying module includes:

if the load parameter is greater than an upper limit value of a preset load range, decreasing an output power at which the electrical energy supplying module performs the wireless charging on the external device; or if the load parameter is less than a lower limit value of a preset load range, increasing an output power at which the electrical energy supplying module performs the wireless charging on the external device.

According to the sixth aspect or the first possible implementation manner of the sixth aspect, in a third possible implementation manner of the sixth aspect, the wireless charging device further includes:

a wireless communications module, configured to communicate with a wireless communications network by using an access device of the wireless communications network, so as to transmit a data signal.

With reference to the third possible implementation manner of the sixth aspect, in a fourth possible implementation manner of the sixth aspect, the wireless communications network is a 2G network, a 3G network, or a 4G network.

According to the sixth aspect or the third possible implementation manner of the sixth aspect, in a fifth possible implementation manner of the sixth aspect, the wireless charging device further includes:

a short range wireless module, configured to communicate with the wireless communications network by using a wireless interface, so as to transmit the data signal.

With reference to the fifth possible implementation manner of the sixth aspect, in a sixth possible implementation manner of the sixth aspect, the wireless interface is a Wi-Fi, Bluetooth, or infrared interface.

It can be learned from the foregoing technical solutions that the present invention has the following beneficial effects:

When a modem cannot use a power supply apparatus, the modem acquires electrical energy from a network device by using a copper twisted pair, which ensures that a data service and a voice service can continue to be provided for a user after an external power supply is powered off, so that user experience is not affected.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the technical solutions in the present invention more comprehensible, the following describes the embodiments of the present invention in detail with reference to the accompanying drawings.

It should be clear that the described embodiments are merely a part rather than all of the embodiments of the present invention. All other embodiments obtained by a person of ordinary skill in the art based on the embodiments of the present invention without creative efforts shall fall within the protection scope of the present invention.

An embodiment of the present invention provide a communications method of a modem, where the method includes:

determining a current power supply mode; and if it is determined that the current power supply mode is that a network device is used to supply power by using a copper twisted pair, switching a communications interface from a fiber interface to an electrical interface, where the electrical interface connects to the network device by using the copper twisted pair and the fiber interface connects to a passive optical network by using an optical fiber.

The electrical interface may further be used to transmit a data signal and/or a voice signal.

Communication may further be performed with a wireless communications network by using an access device of the wireless communications network, so as to transmit the data signal or transmit the voice signal and the data signal.

Embodiment 1

Figure 1:
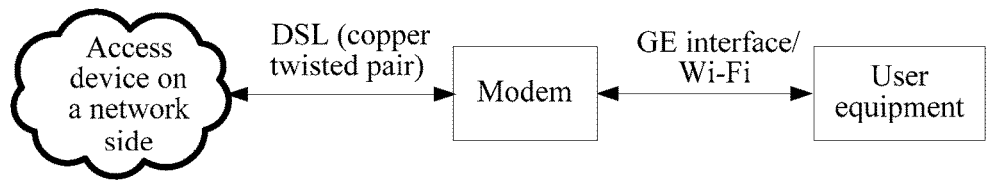
FIG. 1 is an exemplary diagram of a copper twisted pair access manner in the prior art.
Figure 2:
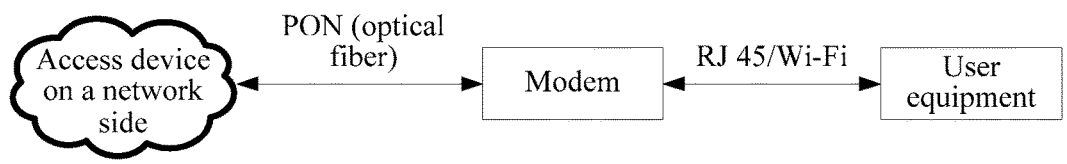
FIG. 2 is an exemplary diagram of a PON access manner in the prior art.
Figure 3:
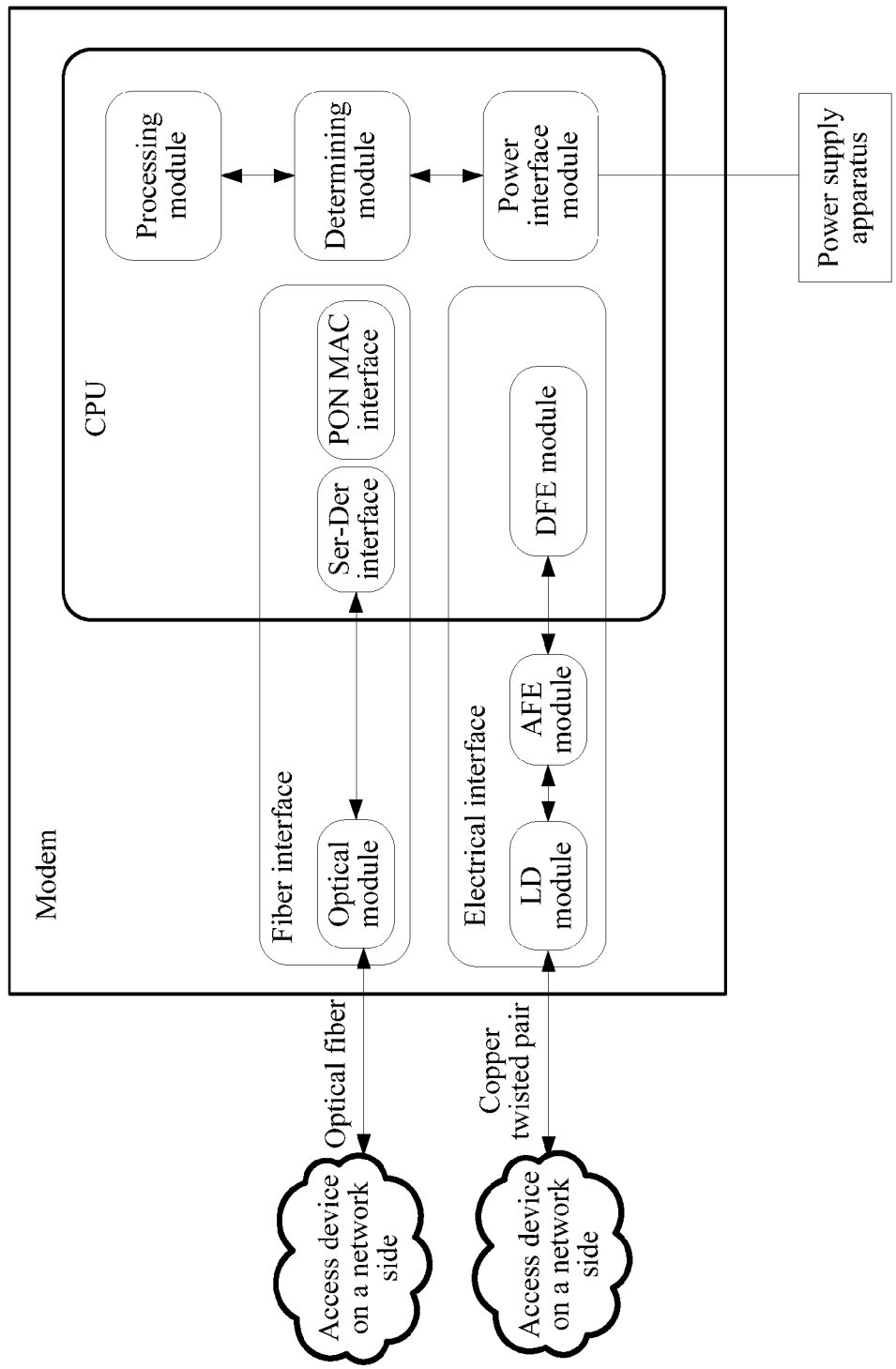
FIG. 3 is a first schematic diagram of Embodiment 1 of a modem according to an embodiment of the present invention.

In this embodiment, a network device is an access device on a network side. FIG. 3 is a first schematic diagram of Embodiment 1 of a modem according to this embodiment of the present invention. As shown in FIG. 3, the modem includes a fiber interface, an electrical interface, and a CPU. The fiber interface connects to a network device by using an optical fiber, where the network device is a passive optical network (Passive Optical Network, PON) device. The electrical interface connects to the access device on the network side by using a copper twisted pair. The CPU includes a determining module, a processing module, and a power interface module, where the power interface module connects to a power supply apparatus, and also connects to the electrical interface by using the copper twisted pair. The determining module is configured to detects the power interface module, and determine, according to a detection result, whether the power supply apparatus can be normally used. If it is determined that the power supply apparatus cannot be normally used, it indicates that the network device is being used to supply power to the modem by using the copper twisted pair.

The fiber interface may use a type such as a subscriber connector (Subscriber Connector or small connector, Small Connector, SC) interface, a fiber connector (Straint Tip, ST) interface or a ferrule connector (Ferrule Connector, FC) interface, where an external strengthen manner of the FC interface is to use a metal jacket, and a fastening manner may be a screw-thread structure; the ST interface is usually used in a 10 Mbps fiber Ethernet (10Base-F), and the SC interface is usually used in 100Base-FX; the electrical interface connecting to the copper twisted pair may be an RJ45 interface or an RJ11 interface; and the copper twisted pair may be an ordinary copper telephone line.

In this embodiment, the fiber interface includes an optical module, a serializer-deserializer (Serializer-Deserializer, Ser-Des) interface, and a PON media access control (Media Access Control, MAC) interface, where the Ser-Des interface and the PON MAC interface are integrated in the CPU and connect to an optical fiber of the PON by using the optical module, which implements a connection between the CPU and the optical fiber; the electrical interface connecting to a copper twisted pair of a DSL includes a decision feedback equalization (Decision Feedback Equalization, DFE) module, an active front end (Active Front End, AFE) module, and a semiconductor laser diode (Laser Diode, LD) module, where the DFE module is integrated in the CPU, and the DFE module performs encapsulation processing on a digital signal by using an ATM adaptation layer (ATM adaptation layer, AAL) protocol and an asynchronous transfer mode (Asynchronous Transfer Mode, ATM) protocol; and the AFE module is configured to modulate a voice signal to the copper twisted pair, the LD module is configured to perform DSL front end line driving and transmit, to the network device by using the copper twisted pair, a data signal that is obtained after encapsulation processing.

In a normal case, the modem accesses the network side in an optical fiber access manner, and needs to use the power supply apparatus by using the power interface module of the modem, and the power supply apparatus supplies power to the modem and the PON. The access device on the network side detects an electrical parameter of a feedback circuit, and determines, according to the electrical parameter of the feedback circuit, whether the modem uses the power supply apparatus. When it is detected that the electrical parameter of the feedback circuit is less than a preset threshold, it indicates that the power supply apparatus is powered off, and the modem and the PON both cannot continue to use the power supply apparatus; therefore, the network device supplies power to the modem by using the copper twisted pair, that is, the network device is used to supply power to the modem by using the copper twisted pair. After the modem obtains electrical energy, the determining module of the CPU determines whether a current power supply mode is that the power supply apparatus is used to supply power or is that the network device is used to supply power by using the copper twisted pair. If the current power supply mode is that the network device is used to supply power by using the copper twisted pair, the processing module of the CPU switches an access manner from the optical fiber access manner to a DSL access manner, that is, the electrical interface is invoked, a communications interface is switched from the fiber interface to the electrical interface, and the data signal and the voice signal are no longer transmitted by using the fiber interface, and instead, the data signal and the voice signal are transmitted by using the electrical interface. Meanwhile, the network device remotely supplies power to the modem by using the copper twisted pair and the electrical interface, and a power supply voltage is usually 48 volt, and power starts to be supplied to the modem by using the network device and the copper twisted pair. In this way, the network device is used to supply power to the modem by using the copper twisted pair, and therefore a data service and a voice service can continue to be provided for a user. For example, the determining module may determine, according to an electrical parameter of the power interface module, whether the current power supply mode is that the power supply apparatus is used to supply power or is that the network device is used to supply power by using the copper twisted pair. If the electrical parameter of the power supply apparatus is less than a preset threshold, it indicates that the power supply device is not used to supply power, and it is determined that the network device is used to supply power by using the copper twisted pair.

Figure 4:
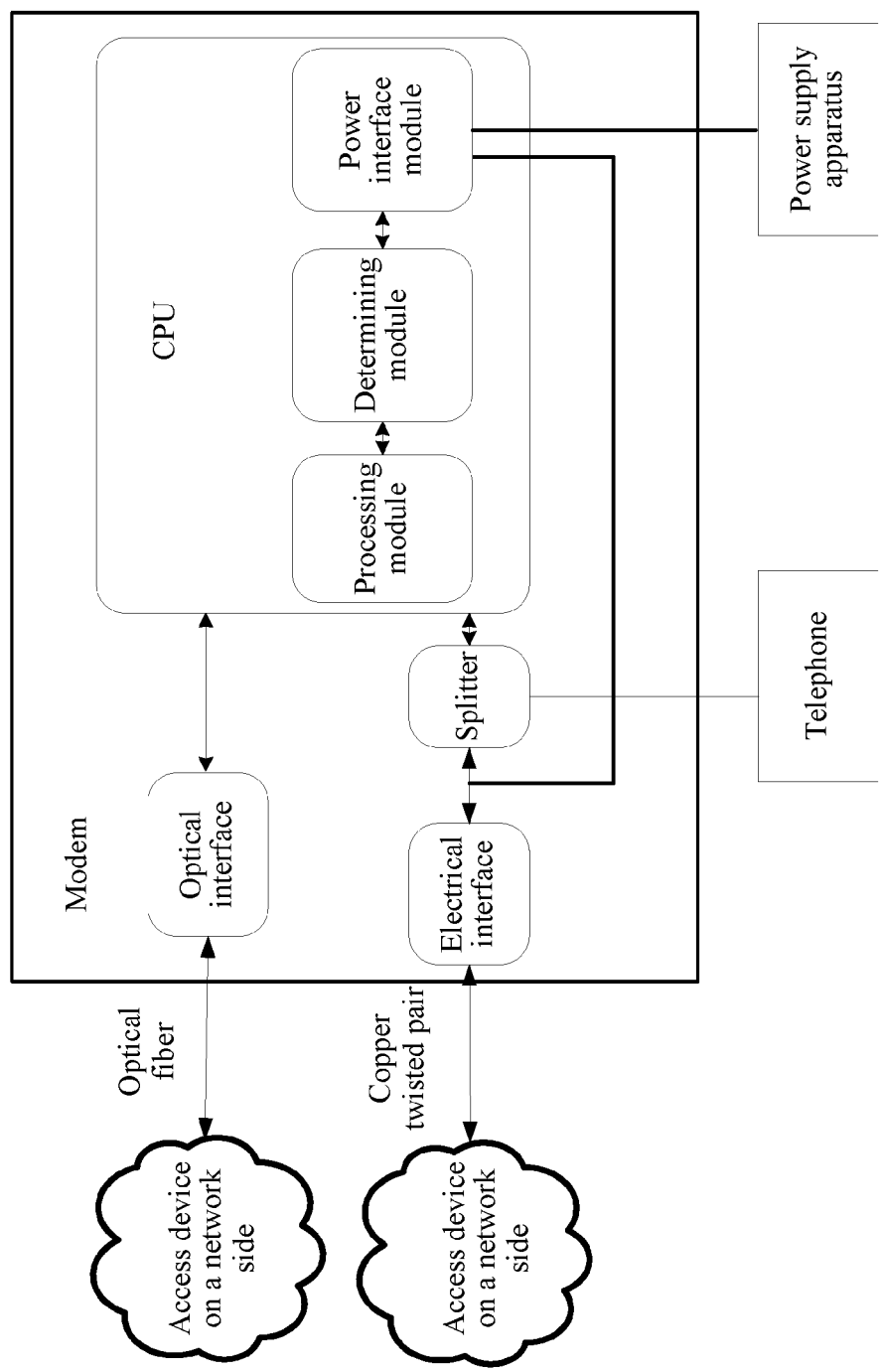
FIG. 4 is a second schematic diagram of Embodiment 1 of a modem according to an embodiment of the present invention.

FIG. 4 is a second schematic diagram of Embodiment 1 of a modem according to this embodiment of the present invention. As shown in FIG. 4, on the basis of the modem shown in FIG. 3, the modem may further include a splitter. The splitter is configured to obtain, by means of splitting, a voice signal and a data signal that are transmitted by using the copper twisted pair. The modem further includes a registered jack interface used to connect a telephone line. The splitter connects to a telephone of a user by using the registered jack interface, so as to transmit the voice signal that is obtained by means of splitting to the telephone of the user. It is ensured that when an electrical parameter of the modem is less than a preset threshold, power supplied by the network device by using the copper twisted pair may be acquired from the electrical interface, so that a voice service can continue to be provided for the user. The registered jack interface may be an RJ11 interface.

Embodiment 2

Figure 5:
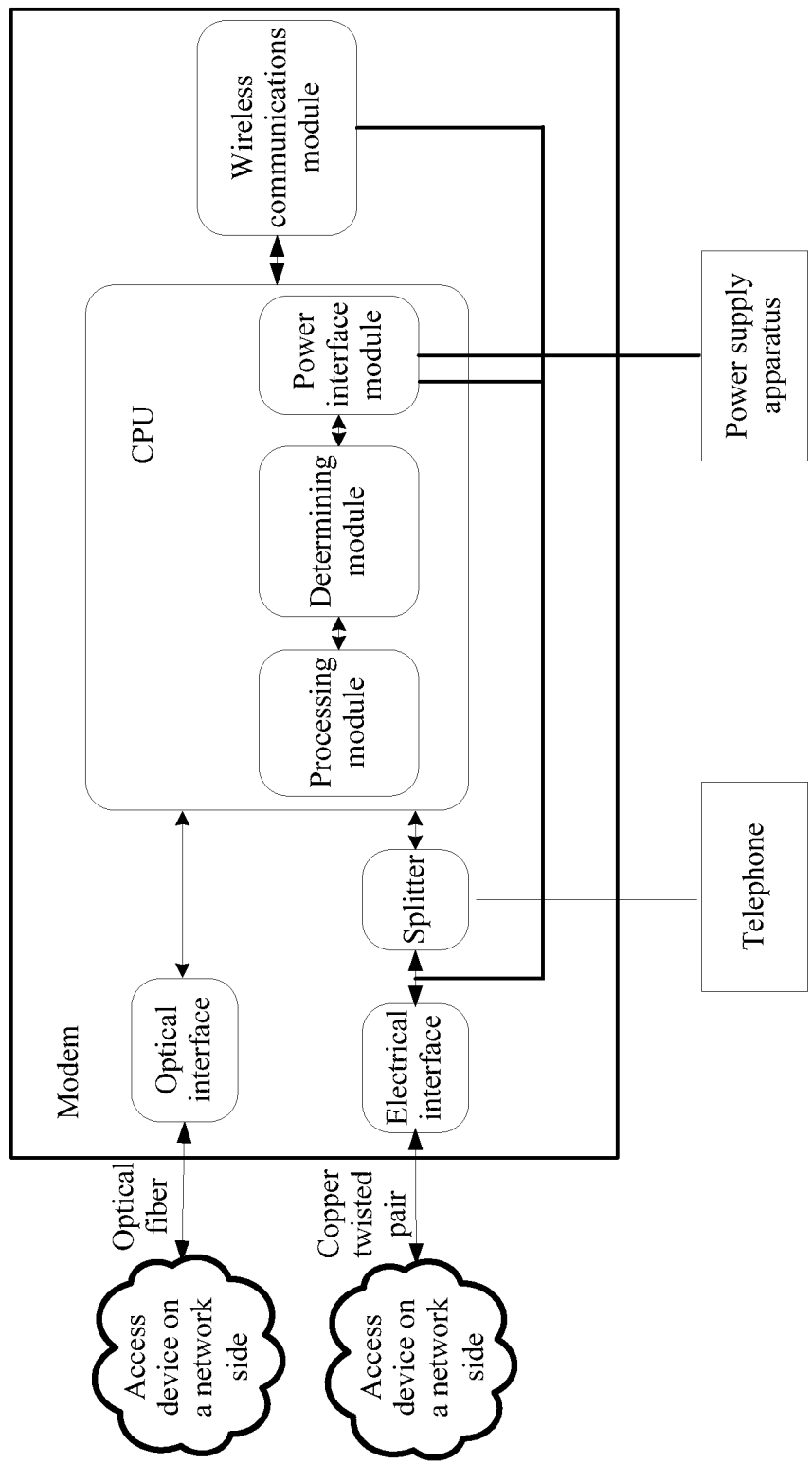
FIG. 5 is a schematic diagram of Embodiment 2 of a modem according to an embodiment of the present invention.

In this embodiment, the network device is an access device on a network side. FIG. 5 is a schematic diagram of Embodiment 2 of a modem according to this embodiment of the present invention. As shown in FIG. 5, compared with Embodiment 1, in this embodiment, the modem provided in Embodiment 1 further includes a wireless communications module.

The wireless communications module of the modem communicates with a wireless communications network by using an access device of the wireless communications network, so as to transmit a data signal or transmit a voice signal and a data signal, where the wireless communications network includes a 2G network, a 3G network, or a 4G network. The wireless communications module connects to a copper twisted pair, and the network device is used to supply power to the wireless communications module by using the copper twisted pair.

In a normal case, the modem accesses the network side in an optical fiber access manner. In this access manner, a power supply apparatus is used to supply power to the modem and a PON. When the power supply apparatus is powered off, which causes that an electrical parameter of the modem is less than a preset threshold, a working manner among an wireless communications module access manner, the optical fiber access manner, and a DSL access manner is as follows:

When a determining module of a CPU determines that a current power supply mode is that the network device is used to supply power by using the copper twisted pair, a processing module switches a communications interface from a fiber interface to an electrical interface. The network device is used to supply power to the CPU by using the copper twisted pair. Meanwhile, the network device is also used to supply power to the wireless communications module by using the copper twisted pair. The CPU acquires a voice signal and a data signal from the electrical interface. A splitter obtains, by means of splitting, the voice signal in the copper twisted pair, and sends the voice signal to a registered jack interface and provides the voice signal for a telephone of a user by using an external telephone line that connects to the registered jack interface, so as to provide a voice service for the user. The CPU acquires a data signal from the wireless communications module, that is, the electrical interface and the wireless communications module provide a data service at the same time. The electrical interface and the wireless communications module may share the data service in a load sharing manner, and the fiber interface does not provide any service.

Embodiment 3

Figure 6:
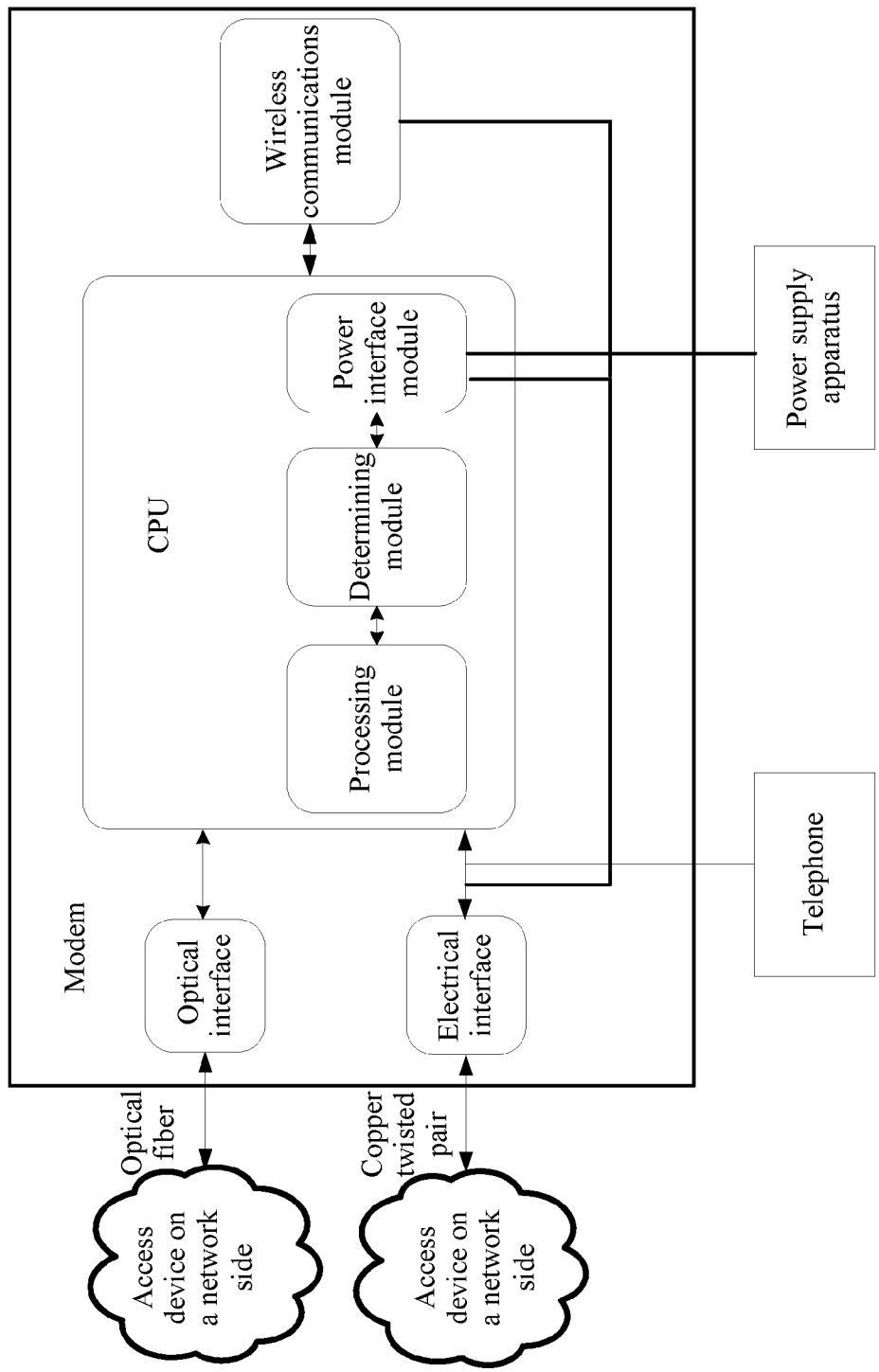
FIG. 6 is a schematic diagram of Embodiment 3 of a modem according to an embodiment of the present invention.

In this embodiment, the network device is an access device on a network side. FIG. 6 is a schematic diagram of Embodiment 3 of a modem according to this embodiment of the present invention. As shown in FIG. 6, compared with FIG. 3, in this embodiment, the modem provided in Embodiment 1 further includes a wireless communications module.

The wireless communications module of the modem communicates with a wireless communications network by using an access device of the wireless communications network, so as to transmit a data signal or transmit a voice signal and a data signal, where the wireless communications network includes a 2G network, a 3G network, or a 4G network. The wireless communications module connects to a copper twisted pair, and the network device is used to supply power to the wireless communications module by using the copper twisted pair.

In a normal case, the modem accesses the network side in an optical fiber access manner. In this access manner, a power supply apparatus is used to supply power to the modem and a PON. When the power supply apparatus is powered off, which causes that an electrical parameter of the modem is less than a preset threshold, a working manner among an wireless communications module access manner, the optical fiber access manner, and a DSL access manner may include the following two types:

1. When a determining module of a CPU determines that a current power supply mode is that the network device is used to supply power by using the copper twisted pair, a processing module switches a communications interface from a fiber interface to an electrical interface. The network device is used to supply power to the CPU by using the copper twisted pair, and the network device is used to supply power by using the copper twisted pair to the wireless communications module that connects to the copper twisted pair. Then, the CPU acquires a data signal from the wireless communications module, and the wireless communications module undertakes data communication and transmits the data signal. Neither the fiber interface nor the electrical interface provides a data service. Meanwhile, the CPU acquires a voice signal from the electrical interface, and the electrical interface undertakes voice communication and transmits the voice signal.

2. When a determining module of a CPU determines that a current power supply mode is that the network device is used to supply power by using the copper twisted pair, a processing module switches a communications interface from a fiber interface to an electrical interface. The network device is used to supply power to the CPU by using the copper twisted pair. Meanwhile, the network device is also used to supply power to the wireless communications module by using the copper twisted pair. The CPU acquires a voice signal and a data signal from the wireless communications module, and the wireless communications module provides a voice service and a data service. Neither the electrical interface nor the fiber interface provides any service.

This embodiment of the present invention provides a communications method of a modem, where the method includes:

determining a current power supply mode; and if it is determined that the current power supply mode is that a network device is used to supply power by using a copper twisted pair, switching a communications interface of a data signal from an electrical interface to a wireless communications module, where the electrical interface connects to the network device by using the copper twisted pair and the wireless communications module connects to a wireless communications network by using an access device of the wireless communications network.

The method further includes: communicating with the wireless communications network by using the access device of the wireless communications network, so as to transmit a data signal or transmit a voice signal and a data signal.

The method further includes: transmitting the voice signal by using the electrical interface.

Embodiment 4

Figure 7:
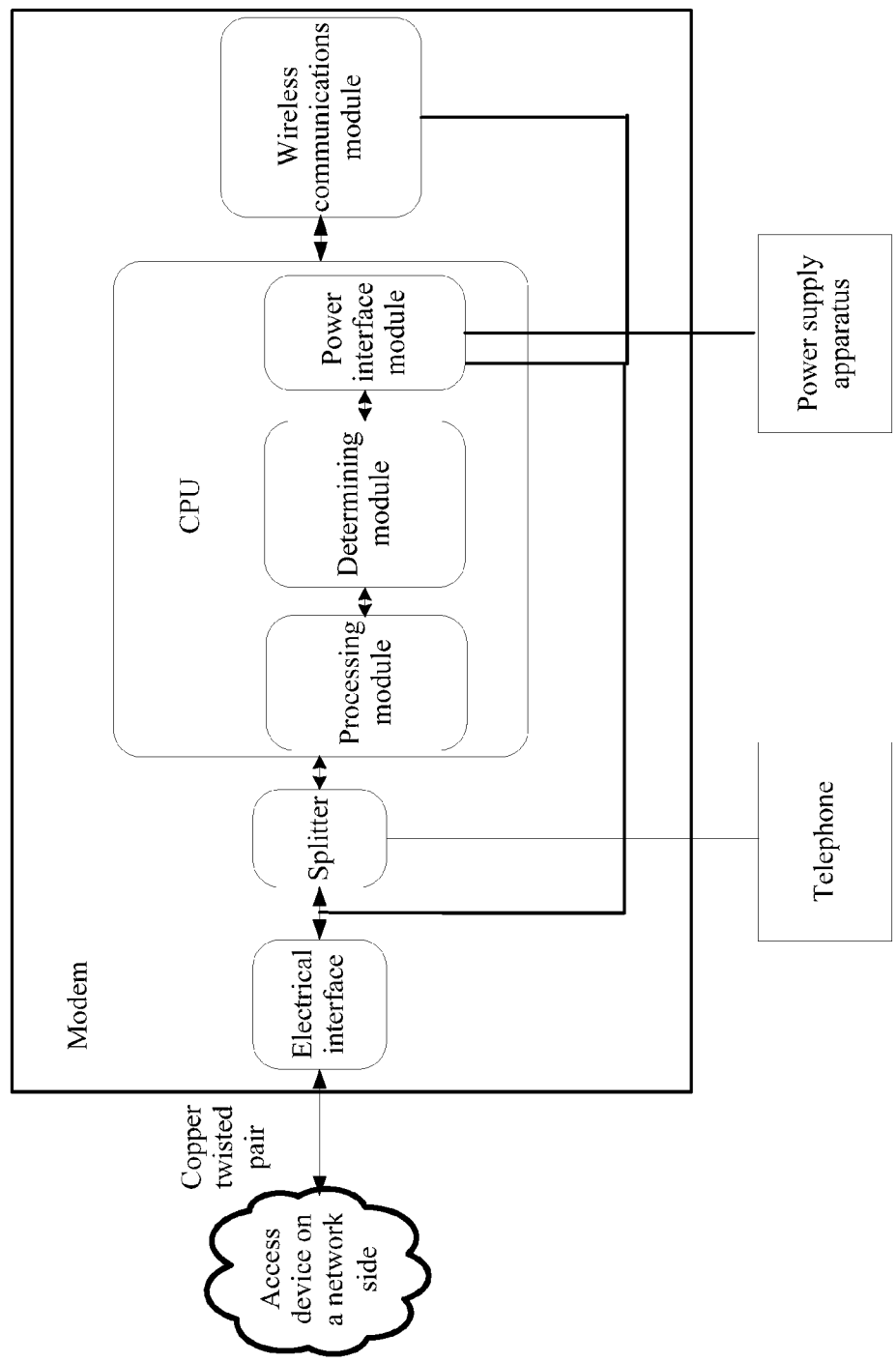
FIG. 7 is a schematic diagram of Embodiment 4 of a modem according to an embodiment of the present invention.

In this embodiment, the network device is an access device on a network side. FIG. 7 is a schematic diagram of Embodiment 4 of a modem according to this embodiment of the present invention. As shown in FIG. 7, the modem includes an electrical interface, a splitter, a CPU, and a wireless communications module. The electrical interface connects to the access device on the network side by using a copper twisted pair. The CPU includes a determining module, a processing module, and a power interface module, where the power interface module connects to a power supply apparatus, and also connects to the electrical interface by using the copper twisted pair. The modem may communicate with an access device of a wireless communications network by using the wireless communications module, where the wireless communications network includes a 2G network, a 3G network, or a 4G network.

When determining that an electrical parameter of the modem is less than a preset threshold, the determining module determines that the power supply apparatus cannot be normally used. It indicates that the power supply device is not used to supply power, and it is determined that the network device is used to supply power by using the copper twisted pair. The processing module of the CPU switches an access manner for accessing the network side and switches a communications interface of a data signal from the electrical interface to the wireless communications module. The electrical interface is invoked and the network device is used to supply power by using the copper twisted pair.

In a normal case, power is supplied to the modem by the power supply apparatus. When the determining module of the CPU determines that the electrical parameter of the modem is less than the preset threshold, it indicates that the modem cannot continue to use the power supply apparatus; therefore, the processing module invokes the electrical interface and acquires a data signal and a voice signal. Meanwhile, the network device supplies power to the modem by using the copper twisted pair and the electrical interface, and a power supply voltage is usually 48 volt. The network device is used to supply power to the modem by using the copper twisted pair, and meanwhile, a data service and a voice service are transmitted by using the copper twisted pair that connects to the electrical interface.

The wireless communications module of the modem communicates with the wireless communications network by using the access device of the wireless communications network, so as to transmit a data signal or transmit a voice signal and a data signal. The wireless communications module connects to the copper twisted pair, and the network device is used to supply power to the wireless communications module by using the copper twisted pair, so that after the power supply apparatus is powered off, the network device is used instead to supply power to the wireless communications module and the CPU by using the copper twisted pair.

When the determining module of the CPU determines that the electrical parameter of the modem is less than the preset threshold, the network device is used to supply power to the CPU by using the copper twisted pair, and the network device is used to supply power to the wireless communications module by using the copper twisted pair. The CPU acquires a voice signal and a data signal from the electrical interface. The splitter obtains, by means of splitting, the voice signal in the copper twisted pair, and sends the voice signal to a registered jack interface and provides the voice signal for a telephone of a user by using an external telephone line that connects to the registered jack interface, so as to provide a voice service for the user. The CPU acquires a data signal from the electrical interface and the wireless communications module, that is, the electrical interface and the wireless communications module provide a data service at the same time. The electrical interface and the wireless communications module may share the data service in a load sharing manner, and the fiber interface does not provide any service.

Embodiment 5

Figure 8:
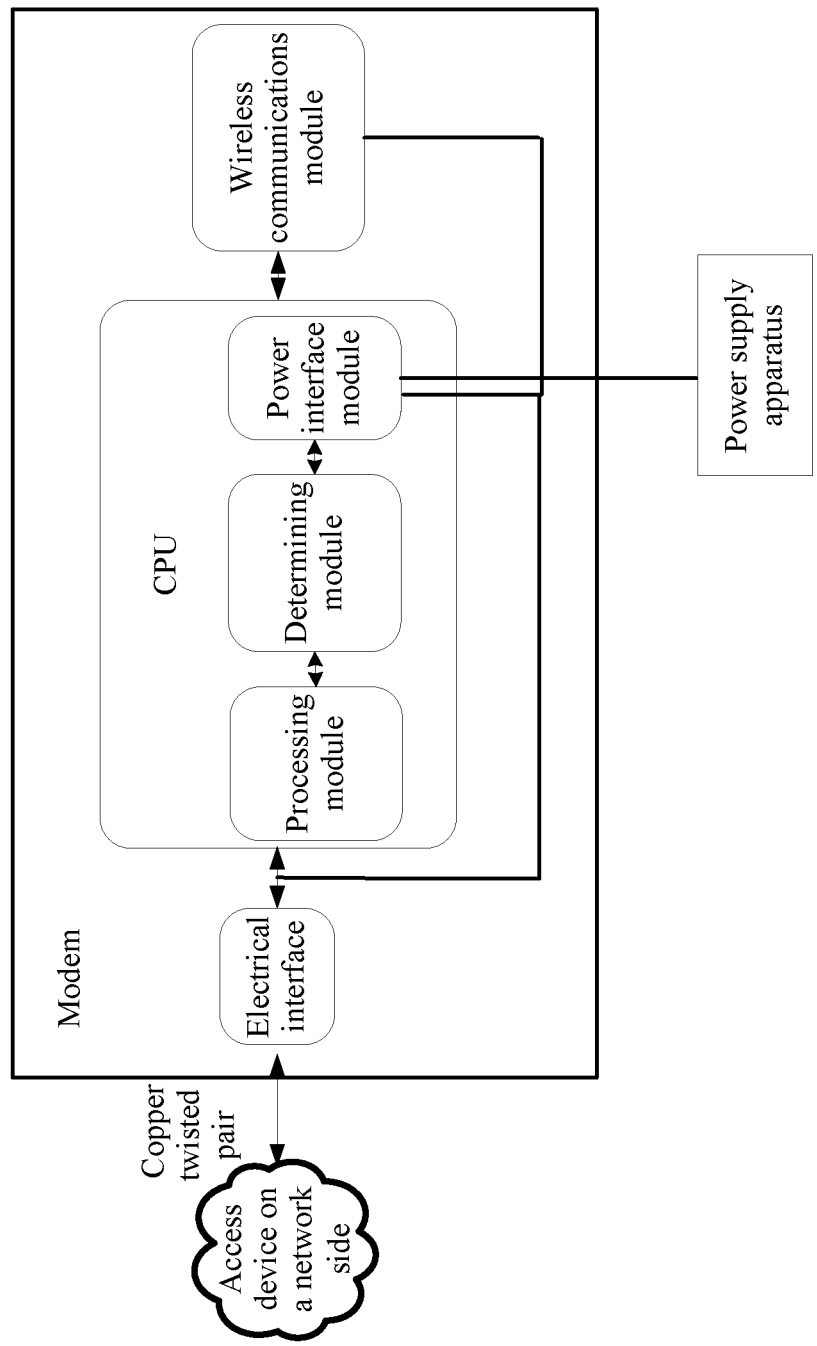
FIG. 8 is a schematic diagram of Embodiment 5 of a modem according to an embodiment of the present invention.

In this embodiment, the network device is an access device on a network side. FIG. 8 is a schematic diagram of Embodiment 5 of a modem according to this embodiment of the present invention. As shown in FIG. 8, the modem includes an electrical interface, a CPU, and a wireless communications module. The electrical interface connects to the network device by using a copper twisted pair. The CPU includes a determining module, a processing module, and a power interface module, where the power interface module connects to a power supply apparatus, and also connects to the electrical interface by using the copper twisted pair. The modem may communicate with an access device of a wireless communications network by using the wireless communications module, where the wireless communications network includes a 2G network, a 3G network, or a 4G network.

When determining that an electrical parameter of the modem is less than a preset threshold, the determining module determines that the power supply apparatus cannot be normally used. It indicates that the power supply device is not used to supply power, and it is determined that the network device is used to supply power by using the copper twisted pair. The processing module of the CPU switches an access manner for accessing the network side and switches a communications interface of a data signal from the electrical interface to the wireless communications module. The electrical interface is invoked, and the network device is used to supply power by using the copper twisted pair.

In a normal case, power is supplied to the modem by the power supply apparatus. When the determining module of the CPU determines that the electrical parameter of the modem is less than the preset threshold, it indicates that the modem cannot continue to use the power supply apparatus; therefore, the processing module invokes the electrical interface, and the network device supplies power to the modem by using the copper twisted pair and the electrical interface, and a power supply voltage is usually 48 volt. The network device is used to supply power to the modem by using the copper twisted pair, and meanwhile, a data service and a voice service are transmitted by using the copper twisted pair that connects to the electrical interface.

The wireless communications module of the modem communicates with the wireless communications network by using the access device of the wireless communications network, so as to transmit a data signal or transmit a voice signal and a data signal. The wireless communications module connects to the copper twisted pair, and the network device is used to supply power to the wireless communications module by using the copper twisted pair, so that after the power supply apparatus is powered off, the network device is used instead to supply power to the wireless communications module and the CPU by using the copper twisted pair.

When the determining module of the CPU determines that the electrical parameter of the modem is less than the preset threshold, the network device is used to supply power to the CPU by using the copper twisted pair, and the network device is used to supply power to the wireless communications module by using the copper twisted pair. The CPU acquires a data signal from the wireless communications module, and the wireless communications module undertakes data communication and transmits the data signal. The electrical interface does not provide a data service. The CPU acquires a voice signal from the electrical interface, and the electrical interface undertakes voice communication and transmits the voice signal.

This embodiment of the present invention provides a wireless charging method, where the method includes:

obtaining, by a wireless charging device, electrical energy that is supplied by a network device by using a copper twisted pair; and performing, by the wireless charging device, wireless charging on an external device by using the electrical energy.

The method further includes: detecting a load parameter of the wireless charging device and performing output control on the wireless charging according to the detected load parameter.

The performing output control on the wireless charging according to the detected load parameter specifically includes: if the load parameter is greater than an upper limit value of a preset load range, decreasing an output power at which the wireless charging is performed on the external device; or if the load parameter is less than a lower limit value of a preset load range, increasing an output power at which the wireless charging is performed on the external device.

The method further includes: communicating, by the wireless charging device, with a wireless communications network by using an access device of the wireless communications network, so as to transmit a data signal.

The method further includes: communicating, by the wireless charging device, with the wireless communications network by using a wireless interface, so as to transmit the data signal.

Embodiment 6

Figure 9:
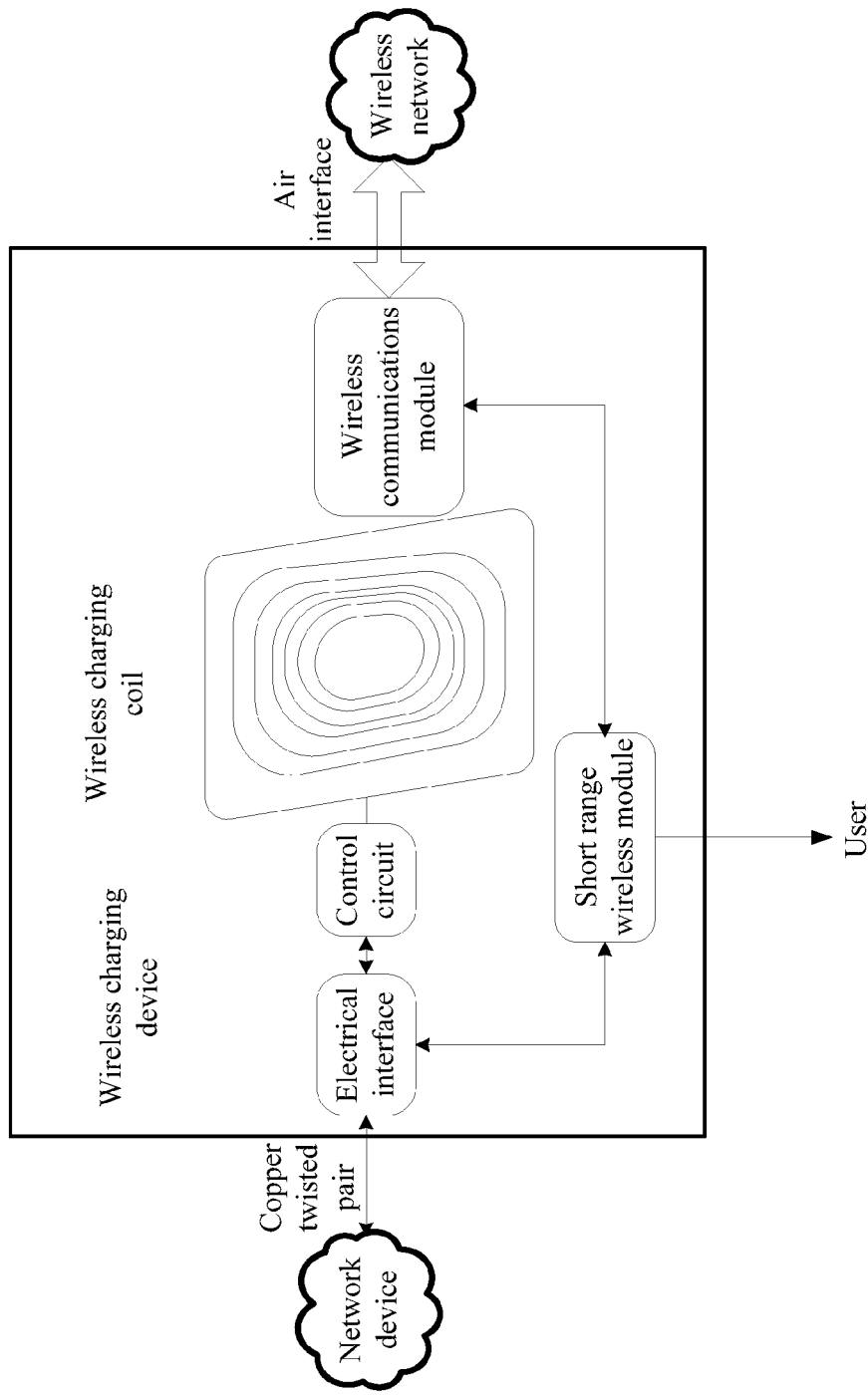
FIG. 9 is a schematic diagram of a wireless charging device according to an embodiment of the present invention.

In this embodiment, a network device is an access device on a network side. FIG. 9 is a schematic diagram of a wireless charging device according to this embodiment of the present invention. As shown in FIG. 9, the wireless charging device includes: an electrical interface, a control circuit, a wireless charging coil. The control circuit connects to a copper twisted pair by using the electrical interface, and the copper twisted pair connects to the network device. The wireless charging coil obtains electrical energy that is supplied by the network device by using the copper twisted pair, and supplies the obtained electrical energy to another external device to perform wireless charging on the external device, where the another external device is a device that has a wireless charging induction coil. The network device is used to supply power to the wireless charging coil in the wireless charging device by using the copper twisted pair. The control circuit is configured to perform output control on the electrical energy that is supplied by the network device by using the copper twisted pair, so as to implement control over an output power, a voltage, a current or a charging time of the wireless charging coil. For example, the control circuit detects a load parameter of the wireless charging coil. When the load parameter is greater than an upper limit value of a preset load range, an output power at which the wireless charging coil performs the wireless charging on the external device is decreased; or when the load parameter is less than a lower limit value of a preset load range, an output power at which the wireless charging coil performs the wireless charging on the external device is increased.

As shown in FIG. 9, the wireless charging device may further include a short range wireless module. The short range wireless module transmits, to a wireless interface, a data signal that is provided by the network device by using the copper twisted pair, and then the data signal is transmitted to a user equipment by using the wireless interface, where the wireless interface may be a Wi-Fi, Bluetooth, or infrared interface.

As shown in FIG. 9, the wireless charging device may further include a wireless communications module. The wireless communications module performs data signal exchange with a wireless communications network by using an air interface. The wireless communications network includes a 2G network, a 3G network, or a 4G network. The air interface may be an interface based on a 3GPP standard protocol such as WCDMA, CDMA2000, TD-SCDMA or LTE. The wireless communications module connects to the short range wireless module and transmits the data signal to the user equipment by using the short range wireless module.

In the present invention, when the access device on the network side remotely supplies power to the modem by using the copper twisted pair and the electrical interface, a voltage that can be provided is 48 volt, which is lower than a voltage provided by the power supply apparatus, and power consumption of the modem is higher in an optical fiber access manner. Therefore, the voltage provided by the access device on the network side cannot support the modem in working in the optical fiber access manner, and therefore the modem does not provide a service by using a fiber interface, but provides a service by using the electrical interface and/or the wireless communications module instead, so as to ensure that the modem can continue to work. Power consumption of the wireless communications module is lower, and the modem may transmit a service by using the added wireless communications module, so that the modem can continue to work, thereby increasing bandwidth and increasing a signal transmission speed.

In the present invention, the access device refers to a network device for wired broadband access, such as a digital subscriber line access multiplexer (Digital Subscriber Line Access Multiplexer, DSLAM).

In the embodiments of the present invention, the data service includes a data service of an xDSL and/or a data service of a passive optical network, where the xDSL is a generic term of various types of digital subscriber lines (Digital Subscriber Line, DSL).

This embodiment of the present invention further provides an apparatus embodiment that is used to implement the steps and the methods in the foregoing method embodiments.

Figure 10:
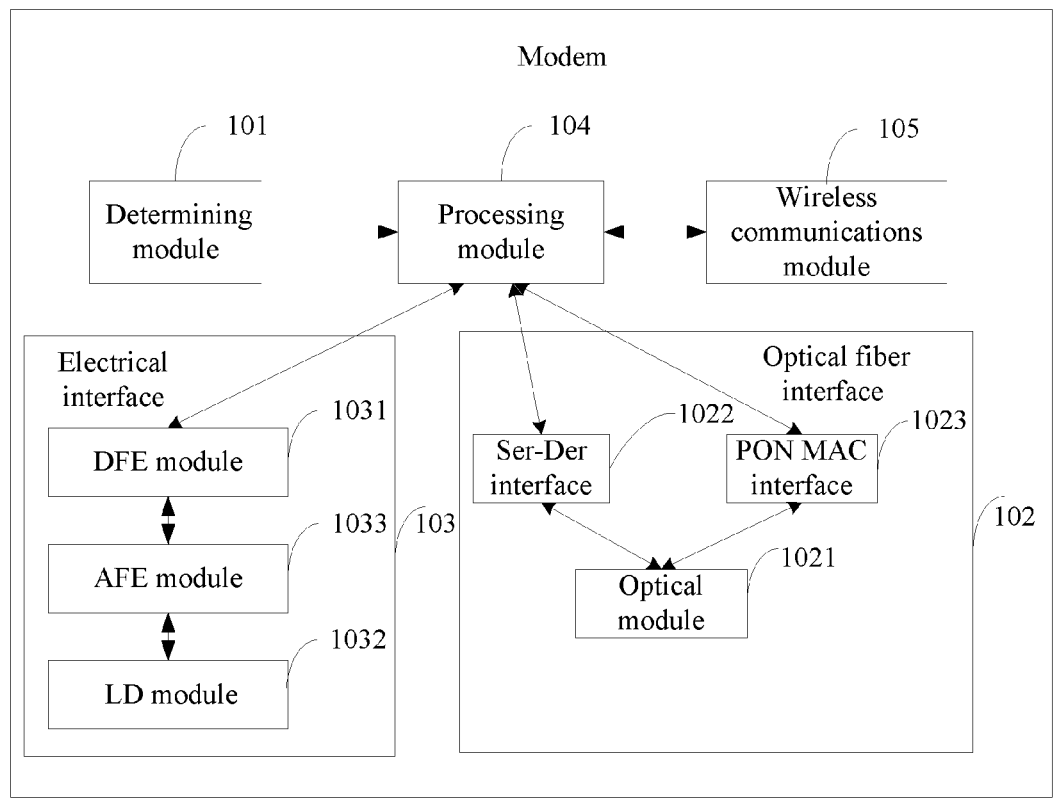
FIG. 10 is a first functional block diagram of a modem according to an embodiment of the present invention.

This embodiment of the present invention further provides a modem. FIG. 10 is a first functional block diagram of a modem according to this embodiment of the present invention. As shown in FIG. 10, the modem includes:

a determining module 101, configured to determine a current power supply mode;

a fiber interface 102, configured to connect to a passive optical network by using an optical fiber;

an electrical interface 103, configured to connect to a network device by using a copper twisted pair; and a processing module 104, configured to: when the determining module 101 determines that the current power supply mode is that the network device is used to supply power by using the copper twisted pair, switch a communications interface from the fiber interface 102 to the electrical interface 103.

The processing module 104 is further configured to transmit a data signal and/or a voice signal by using the electrical interface.

The modem further includes:

a wireless communications module 105, configured to transmit the data signal by using an access device of a wireless communications network, or configured to transmit the voice signal and the data signal by using an access device of a wireless communications network.

The wireless communications network is a 2G network, a 3G network, or a 4G network.

The data signal includes a data signal of a digital subscriber line xDSL and/or a data signal of a passive optical network.

The electrical interface 103 transmits the data signal and the electrical interface 103 further includes:

a decision feedback equalization DFE module 1031, configured to perform encapsulation processing on a digital signal by using an asynchronous transfer mode protocol ATM and an ATM adaptation layer protocol; and a semiconductor laser diode LD module 1032, configured to perform DSL front end line driving, so as to transmit, to the network device by using the copper twisted pair, a data signal that is obtained after encapsulation processing.

The DFE module 1031 is integrated into the processing module.

The electrical interface transmits the voice signal and the electrical interface further includes:

an active front end AFE module 1033, configured to modulate the voice signal to the copper twisted pair.

The fiber interface 102 includes an optical module 1021, a serializer-deserializer Ser-Des interface 1022, and a PON media access control MAC interface 1023; and the Ser-Des interface 1022 and the PON MAC interface 1023 are integrated into the processing module 104.

Figure 11:
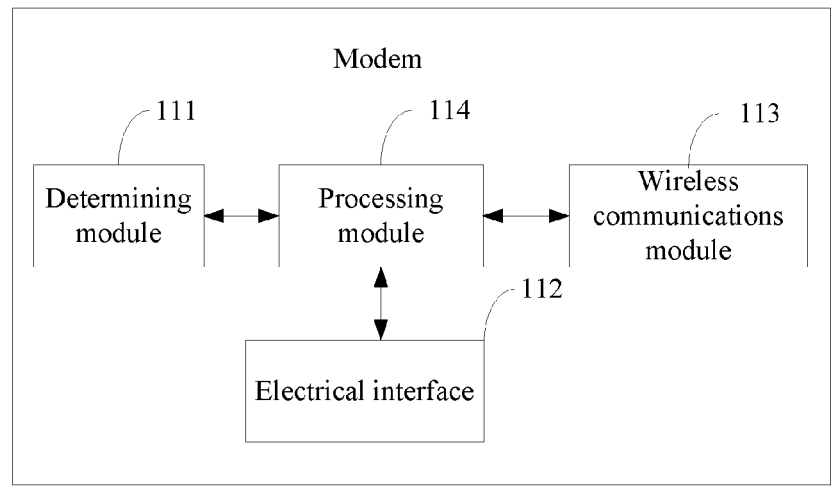
FIG. 11 is a second functional block diagram of a modem according to an embodiment of the present invention.

This embodiment of the present invention further provides a modem. FIG. 11 is a second functional block diagram of a modem according to this embodiment of the present invention. As shown in FIG. 11, the modem includes:

a determining module 111, configured to determine a current power supply mode;

an electrical interface 112, configured to connect to a network device by using a copper twisted pair;

a wireless communications module 113, configured to connect to a wireless communications network by using an access device of the wireless communications network; and a processing module 114, configured to: when the determining module 111 determines that the current power supply mode is that the network device is used to supply power by using the copper twisted pair, switch a communications interface of a data signal from the electrical interface 112 to the wireless communications module 113.

The wireless communications module 113 is further configured to transmit a data signal by using the access device of the wireless communications network; or is further configured to transmit a data signal by using the access device of the wireless communications network and the electrical interface.

The wireless communications network is a 2G network, a 3G network, or a 4G network.

The processing module 114 is further configured to transmit a voice signal by using the electrical interface.

The data signal includes a data signal of a digital subscriber line xDSL and/or a data signal of a passive optical network.

Figure 12:
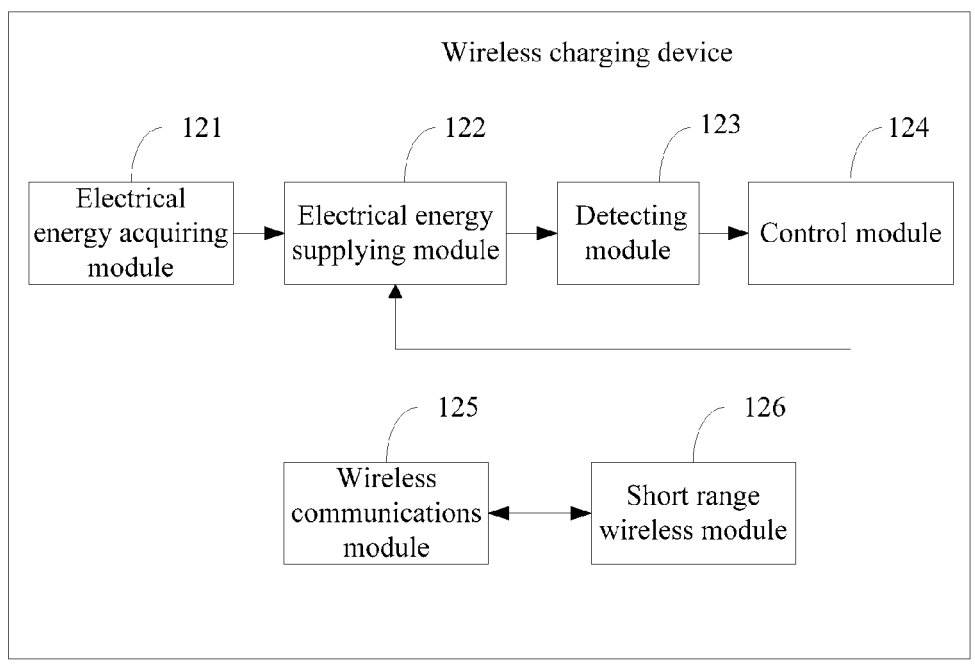
FIG. 12 is a functional block diagram of a wireless charging device according to an embodiment of the present invention.

This embodiment of the present invention further provides a wireless charging device. FIG. 12 is a functional block diagram of a wireless charging device according to this embodiment of the present invention. As shown in FIG. 12, the wireless charging device includes:

an electrical energy acquiring module 121, configured to use a network device to supply power by using a copper twisted pair; and an electrical energy supplying module 122, configured to perform wireless charging on an external device by using the electrical energy that is obtained by the electrical energy acquiring module 121.

The wireless charging device further includes:

a detecting module 123, configured to detect a load parameter of the electrical energy supplying module; and a control module 124, configured to perform, according to the load parameter detected by the detecting module, output control on the wireless charging performed by the electrical energy supplying module.

That the control module 124 performs, according to the load parameter detected by the detecting module, output control on the wireless charging performed by the electrical energy supplying module includes: If the load parameter is greater than an upper limit value of a preset load range, an output power at which the electrical energy supplying module performs the wireless charging on the external device is decreased; or if the load parameter is less than a lower limit value of a preset load range, an output power at which the electrical energy supplying module performs the wireless charging on the external device is increased.

The wireless charging device further includes:

a wireless communications module 125, configured to transmit a data signal by using an access device of a wireless communications network.

The wireless communications network is a 2G network, a 3G network, or a 4G network.

The wireless charging device further includes:

a short range wireless module 126, configured to transmit the data signal by using a wireless interface.

The wireless interface is a Wi-Fi, Bluetooth, or infrared interface.

The present invention has the following beneficial effects:

1. When a modem cannot use a power supply apparatus, power is supplied by another network device to the modem by using a copper twisted pair, which ensures that a data service and a voice service can continue to be provided for a user after an external power supply is powered off, so that user experience is not affected.

2. A wireless communications module is added into the modem, so that the wireless communications module can share a data service and/or a voice service undertook by an electrical interface, so as to increase access bandwidth on a user side, improve data service quality, and enhance user experience of the data service.

3. A wireless charging terminal can charge an external terminal in a wireless manner, and can provide a data service to a user in a wireless manner, thereby bringing freer service experience to the user.

The foregoing descriptions are merely exemplary embodiments of the present invention, but are not intended to limit the present invention. Any modification, equivalent replacement, or improvement made without departing from the spirit and principle of the present invention shall fall within the protection scope of the present invention.

What is claimed is:

1. A communications method implemented in a modem, the modem including a fiber interface configured to connect to a network via a direct connection to a passive optical network access device and an electrical interface configured to connect to the network via a direct connection to a network access device using a copper twisted pair, wherein the method comprises:
  determining a current power supply mode of power supplied to the modem; and
  when it is determined that the current power supply mode is that the network access device is used to supply power to the modem using the copper twisted pair, switching a communications interface of the modem from the fiber interface to the electrical interface, wherein the electrical interface directly connects to the network access device using the copper twisted pair and the fiber interface directly connects to the passive optical network access device using an optical fiber.

2. The method according to claim 1, wherein the method further comprises: transmitting a data signal and/or a voice signal using the electrical interface.

3. The method according to claim 2, wherein the method further comprises:
  communicating with a wireless communications network using an access device of the wireless communications network, so as to transmit the data signal or transmit the voice signal and the data signal.

4. The method according to claim 3, wherein the wireless communications network is a 2G network, a 3G network, or a 4G network.

5. The method according to claim 2, wherein the data signal comprises a data signal of a digital subscriber line (xDSL) and/or a data signal of the passive optical network.

6. The method according to claim 2, wherein the transmitting a data signal using the electrical interface comprises:
  performing encapsulation processing on a digital signal using an asynchronous transfer mode (ATM) protocol and an ATM adaptation layer protocol; and
  performing digital subscriber line (DSL) front end line driving, so as to transmit, to the network access device using the copper twisted pair, a data signal that is obtained after encapsulation processing.

7. The method according to claim 2, wherein the transmitting a voice signal using the electrical interface comprises: modulating the voice signal to the copper twisted pair.

8. A modem, wherein the modem comprises:
  a determining module, configured to determine a current power supply mode of power supplied to the modem;
  a fiber interface, configured to connect to a network via a direct connection to a passive optical network access device using an optical fiber;
  an electrical interface, configured to connect to the network via a direct connection to a network access device using a copper twisted pair; and
  a processing module, configured to: when the determining module determines that the current power supply mode is that the network access device is used to supply power to the modem using the copper twisted pair, switch a communications interface of the modem from the fiber interface to the electrical interface.

9. The modem according to claim 8, wherein the processing module is further configured to transmit a data signal and/or a voice signal using the electrical interface.

10. The modem according to claim 9, wherein the modem further comprises:
  a wireless communications module, configured to communicate with a wireless communications network using an access device of the wireless communications network, so as to transmit the data signal or transmit the voice signal and the data signal.

11. The modem according to claim 10, wherein the wireless communications network is a 2G network, a 3G network, or a 4G network.

12. The modem according to claim 9, wherein the data signal comprises a data signal of a digital subscriber line xDSL and/or a data signal of a passive optical network.

13. The modem according to claim 9, wherein the electrical interface transmits the data signal, and the electrical interface further comprises:
  a decision feedback equalization (DFE) module, configured to perform encapsulation processing on a digital signal using an asynchronous transfer mode (ATM) protocol and an ATM adaptation layer protocol; and a semiconductor laser diode (LD) module, configured to perform digital subscriber line (DSL) front end line driving, so as to transmit, to the network access device using the copper twisted pair, a data signal that is obtained after encapsulation processing.

14. The modem according to claim 13, wherein the DFE module is integrated into the processing module.

15. The modem according to claim 13, wherein the electrical interface transmits the voice signal, and the electrical interface further comprises:

an active front end (AFE) module, configured to modulate the voice signal to the copper twisted pair.

16. The modem according to claim 8, wherein the fiber interface comprises an optical module, a serializer-deserializer (Ser-Des) interface, and a passive optical network (PON) media access control (MAC) interface; and the Ser-Des interface and the PON MAC interface are integrated into the processing module.

* * * * *